(No Model.) 3 Sheets—Sheet 2.
J. PUTMAN & F. E. BERRY.
CHECK ROWER.
No. 285,764. Patented Sept. 25, 1883.
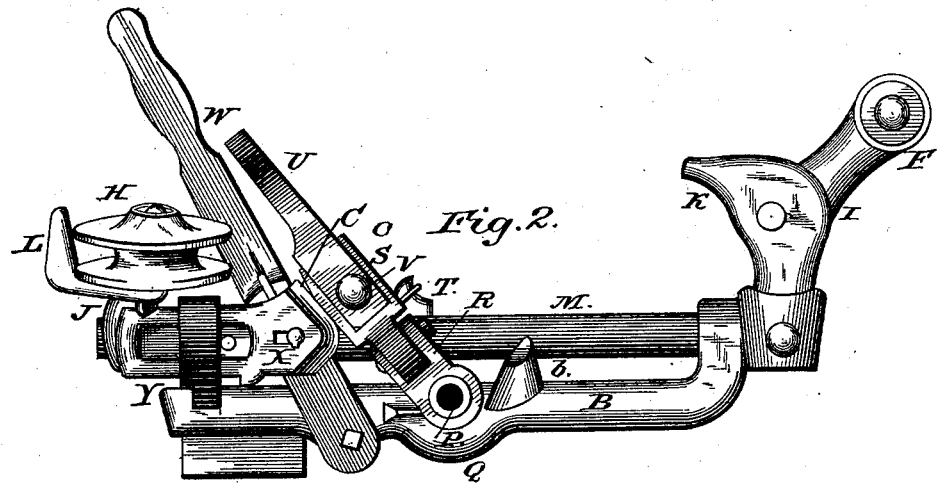
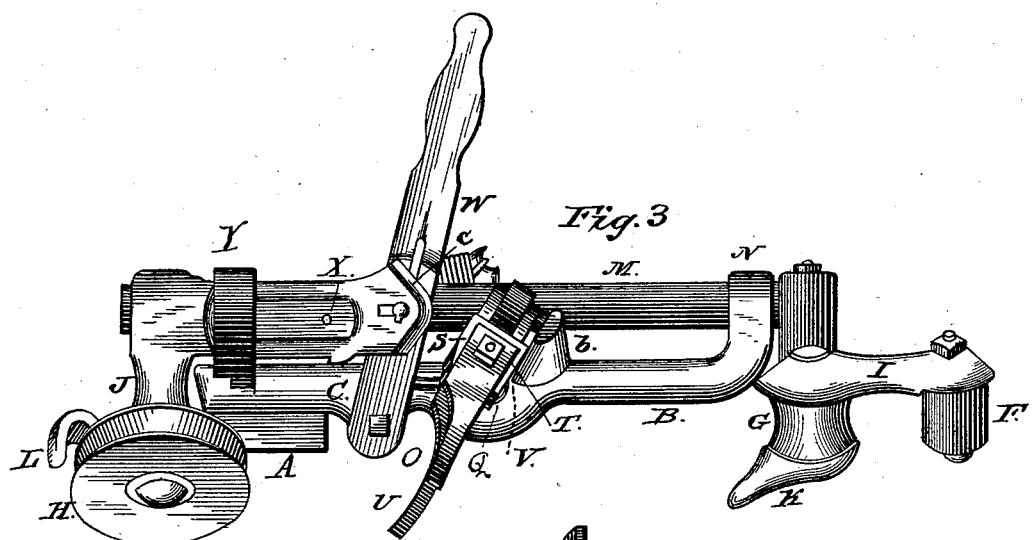
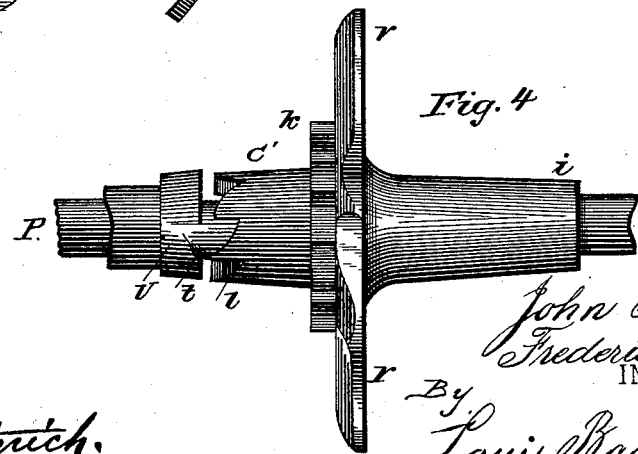
WITNESSES:
Fred. G. Dieterich,
Jno. G. Hinkel.
John Putman
Frederic E. Berry
INVENTOR.
By Louis Bagger & Co.
ATTORNEYS (No Model.) 3 Sheets—Sheet 3.
J. PUTMAN & F. E. BERRY.
CHECK ROWER.
No. 285,764. Patented Sept. 25, 1883.
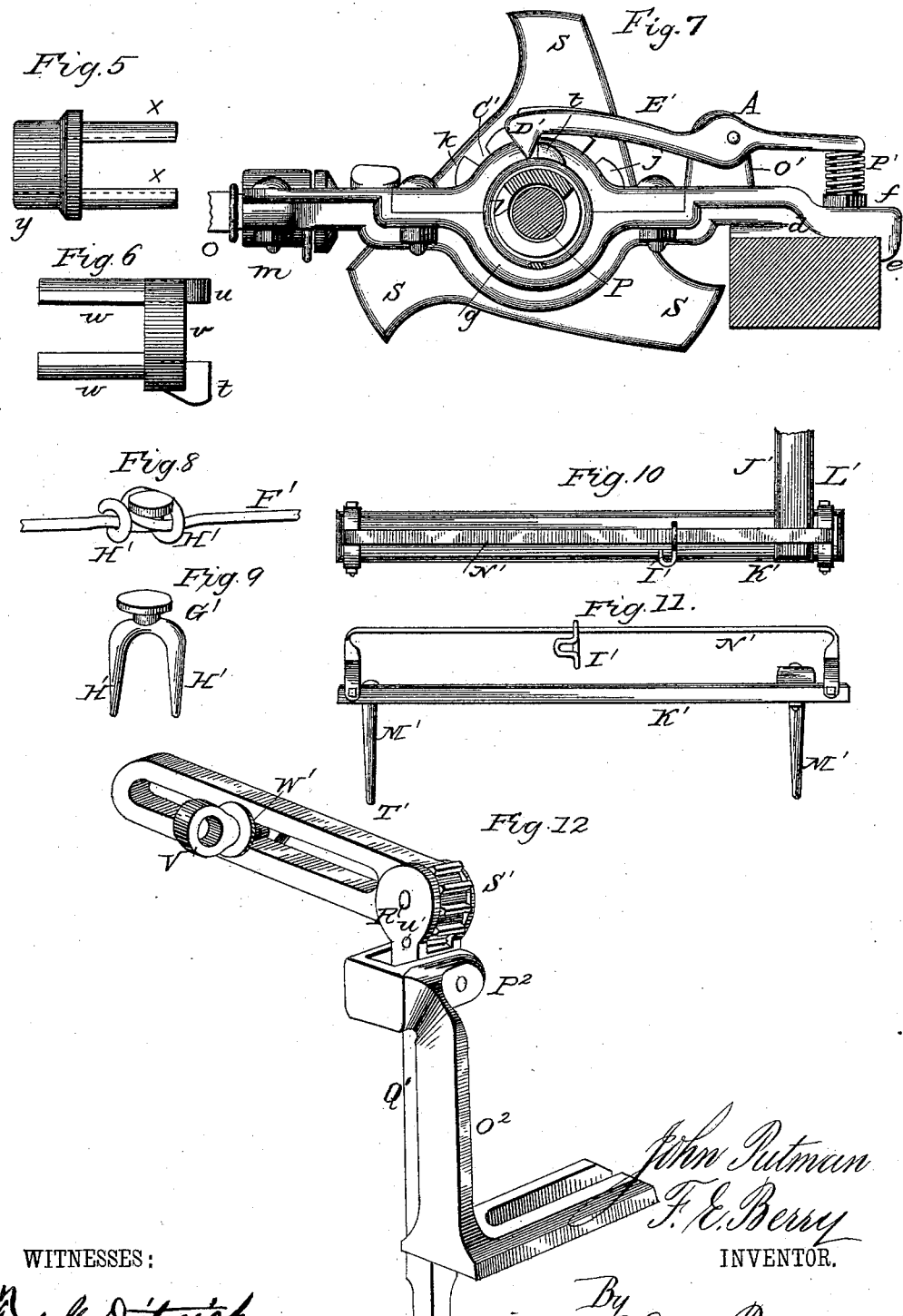
WITNESSES:
Fred. G. Dieterich
J. G. Hinkel
John Putman
F. E. Berry
INVENTOR.
By Louis Bagger & Co.
ATTORNEYS

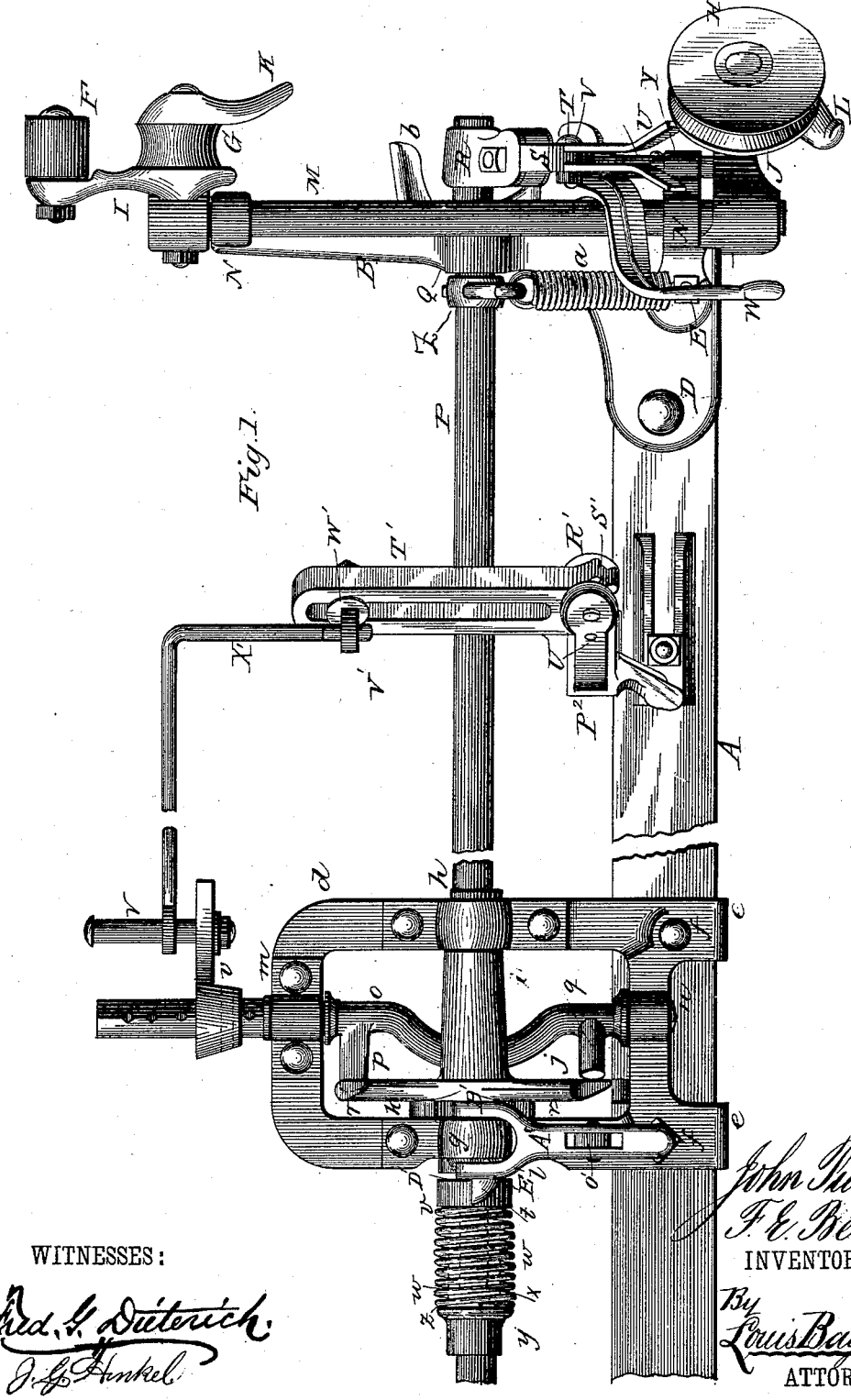

UNITED STATES PATENT OFFICE.

JOHN PUTMAN AND FREDERIC E. BERRY, OF RUSHVILLE, ILLINOIS.

CHECK-ROWER.

SPECIFICATION forming part of Letters Patent No. 285,764, dated September 25, 1883.

Application filed November 25, 1882. (No model.)

*To all whom it may concern:*

Be it known that we, JOHN PUTMAN and FREDERIC E. BERRY, of Rushville, in the county of Schuyler and State of Illinois, have invented certain new and useful Improvements in Check-Rowers; and we do hereby declare that the following is a full, clear, and exact description of the invention, which will enable others skilled in the art to which it appertains to make and use the same, reference being had to the accompanying drawings, which form a part of this specification, and in which—

Figure 1 is a top view of part of our improved check-rower. Fig. 2 is a side view of the same. Fig. 3 is a similar view with the guide-rollers thrown down. Fig. 4 is a detail view of the cam with its ratchet and part of the clutch. Figs. 5 and 6 are similar views of parts of the spring-clutch. Fig. 7 is a side view of the frame, the clutch, ratchet, and cam. Figs. 8 and 9 are detail views of the check-wire knot or button. Fig. 10 is a plan view of the anchor. Fig. 11 is a side view of the same, and Fig. 12 is a detail view of the device for adjusting the throw of the seed-slide.

Similar letters of reference indicate corresponding parts in all the figures.

Our invention has relation to check-row mechanism for corn-planters; and it consists in the improved construction and combination of parts of the same, as hereinafter more fully described and claimed.

In the accompanying drawings, the letter A indicates a part of the frame upon which the mechanism is mounted. Upon the ends of the frame-piece A are fastened two arms, B, having downturned flanges C, which, in connection with the bolts D and E, serve to hold the arms fast and keep them in true position. The guide-rollers F, G, and H are journaled upon arms I and J, having fingers K and L, extending by the rollers G and H, and serving to guide the check-rope and keep it from slipping out from the rollers. The arms I and J are fastened upon the ends of a rod, M, turning in bearings N N upon the arm B.

O is the bifurcated lever, which embraces the check-wire, and is fastened upon each end of the shaft P, which turns in bearings Q in the arms B. These levers consist of four pieces each, the lower part of which, R, is fastened to the shaft P, and has the recessed middle part, S, hinged to it, the hinge being so constructed that it will allow the upper part to fall outward, but prevent it from falling toward the machine. The part S has two recesses, T, in its outer and inner sides, in which the two divergent arms U U are fastened by a screw, V, so that if, by accident, one or both arms should break, or they should become worn out, they may be removed and new arms put in without the necessity of taking anything apart upon the machine or removing the balance of the lever from the shaft.

W is a lever pivoted at its lower end upon the arm B and having pivoted upon it a short arm, X, sliding in a bearing, Y, upon the arm B. The outer free end of this arm extends under and supports the arm J, upon which the guide-pulley is fastened, and by moving lever W arm X is withdrawn and the pulleys swing down, the rod M turning in the bearings N. By thus dropping the pulleys the check-wire is thrown out, the lever O swinging outward, which allows the machine to be disengaged from the check-wire.

Inside the bearings Q in the arms, and fastened upon the shaft P, is a short lever, Z, to the outer hooked end of which is fastened a spiral spring, *a*, the other end of which is fastened to the frame by the screw-bolt E. The levers O are prevented from being tilted too far over by the check-wire, or drawn too far back by the springs, by projections *b* upon the arms B, and by the beveled ends *c* of the arms X.

In the center of the frame-piece A is fastened frame *d*, having downward-projecting lips *e*, which, with the bolts *f f*, serve to hold the frame firmly upon the frame-piece A. In bearings *g* and *h* in the sides of this frame turns a sleeve, *i*, upon which the cam *j* and ratchet *k* are fastened, and the end of which forms a clutch, *l*.

*m* and *n* are two bearings in the ends of the frame *d*, in which turns a curved shaft, *o*, provided with two projections, *p* and *q*, and a crank, *r*, adjustably fastened to it, which is connected to and operates the seed-slides. The shaft P turns inside the sleeve *i*, which is preferably cast in one piece with the cam and ratchet-wheel. The cam $j$ has three projecting arms, $s$, which engage the projections $p$ and $q$, which are placed sixty degrees apart from each other, and the clutch $l$, having six ratchet-teeth. The cam is moved one-sixth revolution at each throw of the end levers and engages and supports one of the projections, moving the seed-slides once for each stroke of the end lever. The clutch $l$ is engaged by two diametrically-opposite projections, $t$ and $u$, upon a short sleeve, $v$, sliding upon the shaft P. From the other end of this sleeve project two fingers, $w$, which occupy each one-fourth of a cylinder-surface, and two similar fingers, $x$, projecting from a sleeve, $y$, fastened to the shaft, intermesh with them, the whole being surrounded by a spiral spring, $z$, bearing against projections or shoulders upon the two sleeves, holding them tightly separated, and allowing the clutch to operate. The ratchet $k$ prevents the cam from moving in either direction by being engaged by a bifurcated pawl, A', having a square downward projection, B', which fits into a square notch, C', at the lower part of each of the ratchet-teeth. The other end of the pawl A', which is pivoted on a projection, O', upon the frame $d$, bears against a spiral spring, P', which is fixed upon the end of one of the bolts $f$. When the end lever, O, is moved, the projections $t$ and $u$ turn with the shaft P, engaging the teeth of the clutch $l$, and when the lever is drawn back by spring $a$ the upper projection, $t$, will raise the downward-projecting end D' of the arm E' of the pawl, and thus raise the projection B' out of the notch C', allowing the ratchet, together with the sleeve and cam, to turn in the one direction.

The check-wire, as shown in Figs. 8 and 9, is of the construction which we prefer to use; and it consists of a strong steel wire, F', which, at suitable intervals, is twisted around the neck G' of a bifurcated piece of malleable iron or other suitable metal, the bifurcated ends H' H' of which are wound around the wire on both sides of the loop formed by the wire, forming a strong knot, which is not easily displaced, and can be made with little labor. The ends of the check-wire are fastened in loops I', sliding upon the anchor J'. This anchor consists of two bars or plates, K' and L', which are fastened together at their ends at right angles, while their free ends are provided with stakes M', which are driven in the ground and hold the anchor fast. Upon one of the arms, K', is fastened a metallic bar, N', the ends of which are bent downward, raising the bar, and are fastened around the ends of arm K'. The loop or ring I' slides upon this bar, which is as long as the distance between the rows, so that when the machine has gone down one row and turns at the other end of the field the ring slides to the other end of the bar, moving the rope the exact width of a row.

To regulate the throw of the seed-slides an upright, O², having a slotted base for adjustment on the frame, may be fastened upon the frame, the upper part of which forms a bearing, P², in which an arm, Q', is pivoted. The lower end of this arm engages the seed-slides, and the upper end, above the bearing, forms a slotted head, R', in which turns the notched head S' of a slotted arm, T'. The arm T' may be adjusted at any angle by a pin, U', inserted through the head R' and engaging between the notches of head S'. A nutted bolt, W', having an eye, V', slides in this slot, and may be adjusted in the same, while a rod, X', which is hinged to the crank $r$, is hinged at its other end to the eye V'. By thus adjusting the eyed bolt W' in the slot the length of throw of the seed-slides may be adjusted, while by changing the angle of the arm T' it may be adjusted to suit any relative position of the seed-slides to the crank.

We are aware that check-rowers have been made in which the guide-rollers are pivoted upon arms fastened to the ends of a rod rocking in bearings upon the ends of the frame, and having means for supporting the said arms and rollers when the machine is in operation, and for allowing them to drop when it is desired to throw the check-wire out off the rocking bifurcated lever, and we do not claim such construction broadly; but

What we claim, and desire to secure by Letters Patent of the United States, is—

1. In a check-rowing mechanism, the combination of the lever W, pivoted upon the arm B, and having arm X pivoted upon it, sliding in bearings Y, with the arms I and J, carrying the guide-rollers, and fastened upon the ends of shaft M, turning in bearings N, upon arms B, substantially as shown and set forth.

2. In a check-rowing mechanism, the frame $d$, having lips $e$, and fastened to the frame-piece A by bolts $f f$, forming projection O' for the pawl, and bearings $g$ $h$ and $m$ $n$, placed at right angles to each other, for the sleeve $i$ and curved rock-shaft O, substantially as shown and set forth.

3. In a check-rowing mechanism, the sleeve $i$, turning on the shaft P in bearings $g$ and $h$, cast in one piece with the ratchet-wheel $k$, and cam $j$, having arms $s$, and having its outer end provided with beveled teeth, forming a clutch, $l$, substantially as shown and set forth.

4. In a check-rowing mechanism, the combination of the clutch $l$, turning upon the shaft, the sleeve $v$, having projections $t$ and $u$ and fingers $w$, the sleeve $y$, fastened to the shaft, and having fingers $x$, meshing with the fingers $w$, and the spiral spring $z$, substantially as shown and set forth.

5. In a check-rowing mechanism, the combination of the sleeve $i$, having ratchet $k$, provided with teeth having square notches C' at their lower parts, and forming a clutch, $l$, the spring-actuated sleeve $v$, having projections $t$ and $u$, and the bifurated pawl A', having square downward projection B' on one arm, and having the other arm bent downward at D', pivoted upon the projection O' upon the frame d, and actuated by the spiral spring P', substantially as shown and set forth.

6. In a check-rowing mechanism, the combination of the frame d, having projection O', bearings g h and m n, and bolt f, the sleeve i, having cam j, ratchet k, and clutch l, the bent rock-shaft o, having projections p and q, and crank r, sleeve v, having projections t and u, and fingers w, sleeve y, having fingers x, spiral spring z, and bifurcated pawl A', having downward projections C' and D', and spring P, substantially as shown and set forth.

7. In a check-rowing mechanism, the frame, piece A, the arms B, rods M, having arms I and J, and guide-rollers F, G, and H, levers W, having arms X, bifurcated levers O, shaft P, hooked lever Z, spring a, frame d, sleeve i, ratchet k, clutch l, cam j, curved rock-shaft o, having projections p and q, crank r, sleeve v, having projections t and u, and fingers w, sleeve y, having fingers x, spring z, and bifurcated pawl A', having downward projections C' and D', and spring P', all constructed and combined to operate substantially as shown and set forth.

8. The combination, in a check-row cornplanter, of the crank r, pitman X, arms Q' T', pivoted on upright O', and the seed-slides, substantially as shown and set forth.

In testimony that we claim the foregoing as our own we have hereunto affixed our signatures in presence of two witnesses.

JOHN PUTMAN.
FREDERIC E. BERRY.

Witnesses:
ORANGE E. SACKETT,
WILLIAM C. OUTTEN.